United States Patent

Nichols

[15] 3,655,201
[45] Apr. 11, 1972

[54] PATTERN FORMING PUZZLE AND METHOD WITH PIECES ROTATABLE IN GROUPS

[72] Inventor: Larry D. Nichols, Arlington, Mass.

[73] Assignee: Moleculon Research Corporation, Cambridge, Mass.

[22] Filed: Mar. 4, 1970

[21] Appl. No.: 16,473

[52] U.S. Cl. .................................273/153 R, 46/25
[51] Int. Cl. ...............................................A63f 9/08
[58] Field of Search..................273/155, 156, 157 R, 153 R; 35/22 R; 46/24, 25

[56] References Cited

UNITED STATES PATENTS

| | | | |
|---|---|---|---|
| 3,222,072 | 12/1965 | Dreyer | 273/253 R UX |
| 636,109 | 10/1899 | Bowers | 273/155 |
| 2,939,243 | 6/1960 | Duggar | 46/24 |

FOREIGN PATENTS OR APPLICATIONS

| | | | |
|---|---|---|---|
| 283,666 | 1/1928 | Great Britain | 273/156 |
| 675,678 | 7/1952 | Great Britain | 273/157 |

*Primary Examiner*—Anton O. Oechsle
*Attorney*—Richard P. Crowley and Richard L. Stevens

[57] ABSTRACT

Eight cube-type pieces are magnetically engaged to form a cube-type assembly with educational and entertaining features. The cubes are adapted to rotate in complementary sets of four about one of three mutually perpendicular axes. Each cube has colored surfaces and when properly arranged one distinct color on each of the six faces is presented. Each set which shares one face of the assembly may be rotated in multiples of 90° with respect to the other set. If the assembly is initially arranged properly and then disarranged by a random sequence of rotations, it then serves as a device whose object is the restoration of the original arrangement.

10 Claims, 6 Drawing Figures

Patented April 11, 1972
3,655,201
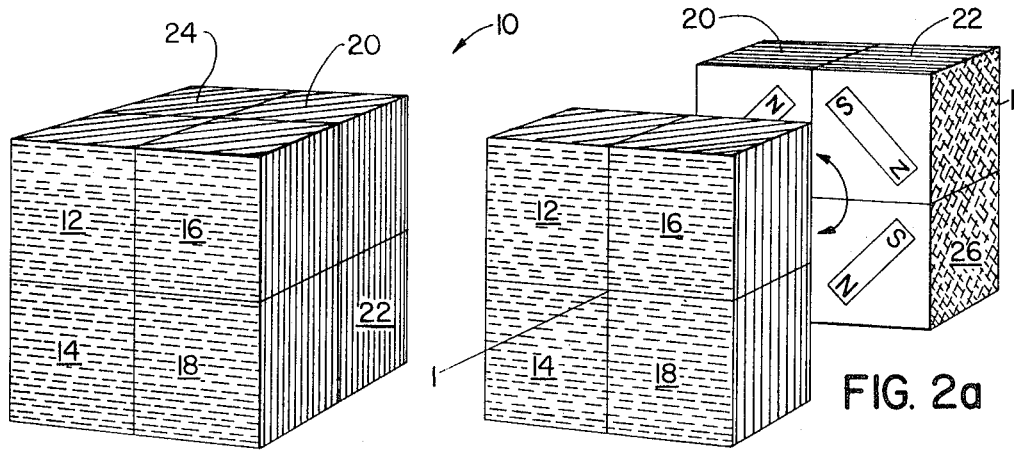
FIG. 1
FIG. 2a
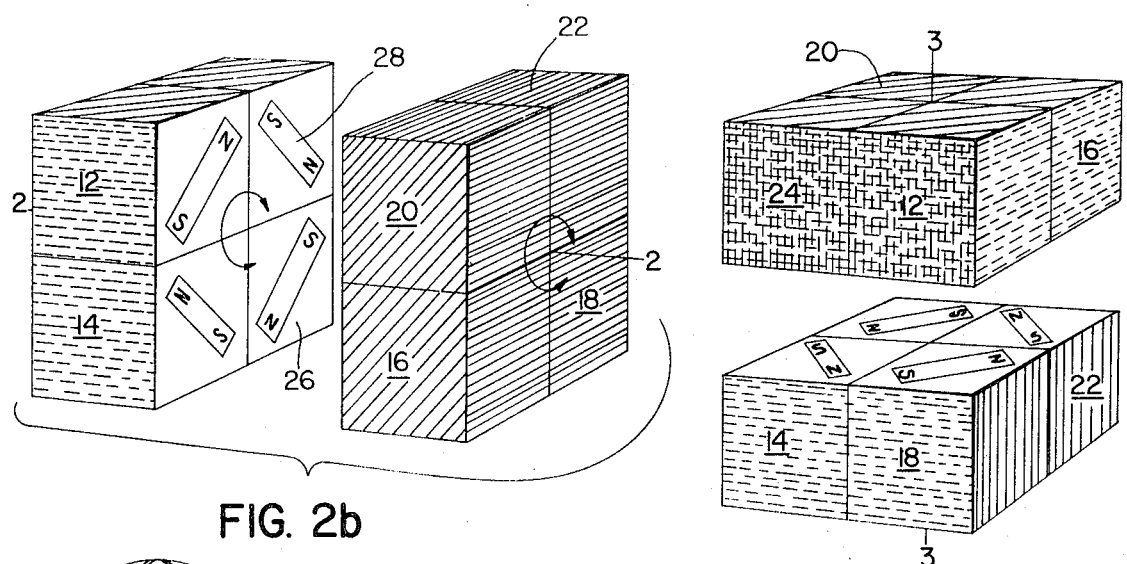
FIG. 2b
FIG. 2c
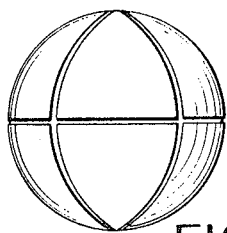
FIG. 4
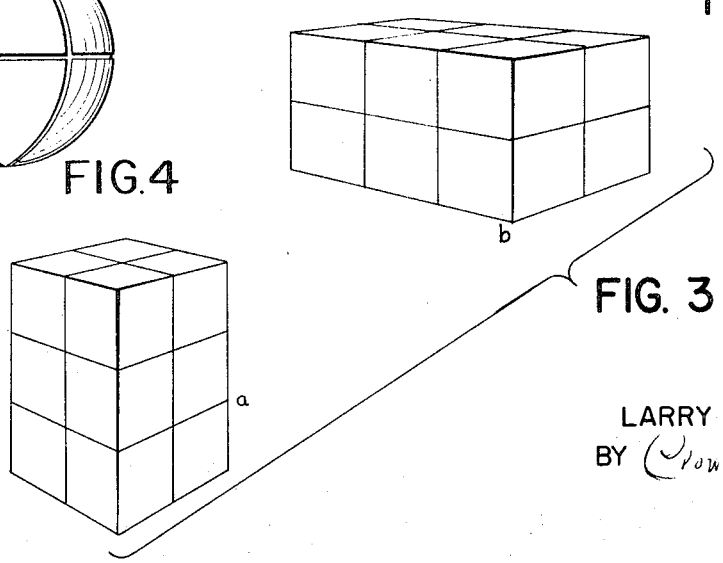
FIG. 3
INVENTOR
LARRY D. NICHOLS
BY Crowley & Herens
ATTORNEYS

PATTERN FORMING PUZZLE AND METHOD WITH PIECES ROTATABLE IN GROUPS

SUMMARY OF THE INVENTION

This invention relates to a device which may be utilized as a new form of puzzle in which portions of an assembly of engaged mobile pieces are rotated relative to one another about various axes in an effort to achieve certain predetermined arrangements of the pieces. Aside from its entertaining aspects, the device also finds application in the educational field to demonstrate the effect of repetitive operations on symmetrical structures, and particularly to demonstrate noncommutative operations in which the final result depends on the order of the individual steps; such noncommutative operations are fundamental to modern mathematics and science. The device may also be used to provide practice in the comprehension and visualization of complex spatial structures and to promote training in the application of alogrithms to problem solving; it poses certain problems best solved by previous mastery of important algorithmic sequences of operations. It can also be expected that this device, like many other puzzles combining manual and mental skills, will prove useful in psychological and psychiatric testing programs.

Briefly, the invention comprises a set of internally engaged and externally decorated pieces assembled into a structure which constantly poses a choice between two or more distinct manual operations, each consisting of rotation of one set of pieces with respect to the remainder, and each leading to a different subsequent arrangement of pieces and another choice of alternative operations. In particular, the invention includes such devices wherein the engagement is provided by mechanical or magnetic means providing structural integrity without restriction of rotational freedom, and wherein each piece is colored or patterned on its exposed surfaces in a way which allows its arrangement, with the other pieces, into a recognizable predetermined pattern whose establishment is the object of manipulation.

BRIEF DESCRIPTION OF THE DRAWINGS

FIG. 1 is an isometric view of one embodiment of the invention in a three-dimensional form;

FIGS. 2a, 2b, and 2c are isometric views of FIG. 1 defining the various axes about which the various subsets of the structure may rotate;

FIGS. 3a and 3b are alternative embodiments of FIG. 1; and

FIG. 4 is an isometric view of an alternative embodiment of the invention in three-dimensional form.

DESCRIPTION OF PREFERRED EMBODIMENT

The preferred embodiment will be described in reference to a three-dimensional structure as shown in FIG. 1 which comprises a cube 10 divided into eight smaller cubes 12–26. Each cube includes an exposed surface and a nonexposed surface. The nonexposed surfaces as shown in FIG. 2 are characterized by having magnet means 28 disposed therein which are adapted releasably to engage with the nonexposed surfaces of similar cubes. As shown each of the cubes has an exposed surface which comprises three faces of the cube, each face having a different color thereon. In FIG. 1 each of the eight cubes is arranged so that the entire face of any of the six sides of the complete structure presents a uniform color. In other words, the exposed surfaces are colored so as to allow the complete cube if its component parts are properly arranged to present one distinct coloration on each of its six faces. With this embodiment of the invention, rotation of any set of four smaller cubes which share one face of the larger cube with respect to the other set of four cubes is an allowed movement or twist. That is, each such set can be rotated about a mutual axis with respect to the other set without relative movement of the individual cubes within either set. If the structure is initially arranged properly and then disarranged by a random sequence of twists about the three possible axes as shown in FIGS. 2a, 2b, and 2c, it then serves as a device whose object is the restoration of the original arrangement.

In FIG. 2a, the cubes 12, 14, 16, and 18, and the cubes 20, 22, 24, and 26 comprise respectively a first and second set which may be disengaged from one another and rotated about the axis shown by line 1—1. As shown in FIG. 2a, the second set has been twisted 90° counterclockwise from its position in FIG. 1. In FIG. 2b the cubes 16, 18, 20 and 22 form a third set and the cubes 12, 14, 24 and 26 form a fourth set, these sets being adapted to rotate about a second axis shown by line 2—2. As shown in FIG. 2b, the fourth set has been twisted 90° counterclockwise from its position in FIG. 1. Similarly referring to FIG. 2c, the cubes 12, 16, 20 and 24 form a fifth set and the cubes 14, 18, 22 and 26 form a sixth set each set again, as the others, magnetically engaged and adapted to rotate about the third axis shown by line 3—3. As shown the fifth set has been twisted 90° counterclockwise from its position in FIG. 1.

The allowed twists include rotation of any of the six sets as defined in FIGS. 2a, 2b, and 2c through 90°, 180°, or 270° with respect to its complementary set.

In FIG. 1 the device is in the solved or pattern-established position, the six faces of the cube each being a uniform and distinguishable color or pattern. As shown, the faces are colored as follows: back face black, bottom face orange, top face brown, front face silver, right face red, and left face gold. Any number of random twists of the sets one with respect to another about the different axes scrambles the pattern. The solution then requires restoring the cube to its original configuration.

Although the three-dimensional aspect of the invention has been described with reference to a cube, other geometric configurations may be used for a three-dimensional embodiment. For example, a sphere divided into eight octants represents the same concept in a different form; the octants fall into six sets in a manner similar to the cube, such as shown in FIG. 4, in that the eight octants are divided by three coordinate planes along which the various sets may be disengaged and twisted.

If desired, fewer than six colors may be used making the restoration of the predetermined pattern simpler to achieve, or other color schemes or graphic representations may be placed on the exposed surfaces of the device.

Although FIGS. 1 and 2 have been described with particular reference to eight cubes magnetically engaged and adapted to form various sets of four cubes each able to twist about a fixed axis, this effect may be multiplied in other embodiments. For example, referring to FIG. 3 additional sets of cubes are added to the basic embodiment to provide additional planes within which various sets of pieces may rotate or twist with respect to other sets. In any of these three-dimensional embodiments it is also possible to achieve engagement by mechanical rather than magnetic means, as for example by using a pop-in snap linkage, or a tongue-in-groove arrangement allowing rotation without disengagement.

What I claim is:

1. A method for restoring a preselected pattern from sets of pieces, which pieces have constantly exposed and constantly nonexposed surfaces, the exposed surfaces adapted to be combined to form the preselected pattern, which sets when in random engagement fail to display said preselected pattern which comprises:
    a. engaging a plurality of pieces in a coherent structure;
    b. providing a first set having at least two pieces each of said pieces having an exposed and a nonexposed surface;
    c. providing a second set having at least two pieces each of said pieces having an exposed and a nonexposed surface;
    d. providing a third set having at least four pieces each of said pieces having an exposed and a nonexposed surface, the third set forming with the first and second sets a composite structure, the exposed surfaces of each of the sets forming a portion of the composite preselected pattern;
    e. rotating said pieces in complementary sets of four about any of three mutually perpendicular axes; and
    f. repeating step (e) until the preselected pattern is achieved.

2. The method of claim 1 which includes rotating said sets about their respective axes through multiples of 90°.

3. A method for restoring a preselected pattern from sets of pieces which pieces have constantly exposed and constantly nonexposed surfaces, the exposed surfaces adapted to be combined to form the preselected pattern, which sets when in random engagement fail to display said preselected pattern which comprises:
   a. engaging eight cube pieces as a composite cube;
   b. rotating a first set of cube pieces comprising four cubes about a first axis;
   c. rotating a second set of four cubes about a second axis; and
   d. repeating steps (b) and (c) until the preselected pattern is achieved.

4. The method of claim 3 which includes rotating sets of cubes about one of three mutually perpendicular axes with reference to the composite structure.

5. The method of claim 3 wherein the sets of cubes are rotated through multiples of 90°.

6. A puzzle comprising at least eight pieces, visually distinquishable indicia on at least one face of each piece with the eight pieces together having at least two visually distinct indicia, means associated with each of the remaining faces only of each of the pieces releasably maintaining the pieces in assembled relationship forming a composite structure, said maintaining means enabling three interaffiliated groups of four contiguous pieces each to be rotated respectively about three mutually perpendicular axes, the two distinct indicia being so located on the respective pieces that the groups can be rotated to effect the display of at least two distinct indicia of the composite structure.

7. The puzzle of claim 6 wherein the composite structure is a sphere and the visually distinguishable indicia is on the exposed face only on each piece.

8. The puzzle of claim 6 wherein the means to releasably maintain the pieces in assembled relationship includes magnets.

9. A puzzle comprising eight cubes, visually distinquishable indicia on three faces only of each cubes with the eight cubes together having six visually distinct indicia,
   means associated with each of the remaining faces only of each of the cubes releasably maintaining the cubes in assembled relationship forming a composite cube, said maintaining means enabling three interaffiliated groups of four contiguous cubes each to be rotated respectively about three mutually perpendicular axes,
   the six distinct indicia being so located on the respective cubes that the cube groups can be rotated to effect the display of a distinct indicia on each of the six faces of the composite cube.

10. The puzzle of claim 13 wherein the means releasably maintaining the cubes in assembled relationship includes magnets.

* * * * *

Disclaimer 3,655,201.—*Larry D. Nichols*, Arlington, Mass. PATTERN FORMING PUZZLE AND METHOD WITH PIECES ROTATABLE IN GROUPS. Patent dated Apr. 11, 1972. Disclaimer filed Apr. 25, 1983, by the assignee, *Moleculon Research Corp.*

Hereby enters this disclaimer to claims 1 and 2 of said patent.

[*Official Gazette September 13, 1983.*]

UNITED STATES PATENT AND TRADEMARK OFFICE
CERTIFICATE OF CORRECTION

PATENT NO. : 3,655,201
DATED : April 11, 1972
INVENTOR(S) : Larry D. Nichols

It is certified that error appears in the above-identified patent and that said Letters Patent is hereby corrected as shown below:

Column 4, line 11, "each cubes" should read -- each cube --.

Column 4, line 23, "claim 13" should read -- claim 9 --.

Signed and Sealed this

Eighth Day of November 1983

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 3,655,201  Page 1 of 2
DATED     : April 11, 1972
INVENTOR(S) : Larry D. Nichols It is certified that error appears in the above-identified patent and that said Letters Patent is hereby corrected as shown below:

In the drawings, figures 2b and 2c should appear as shown below:

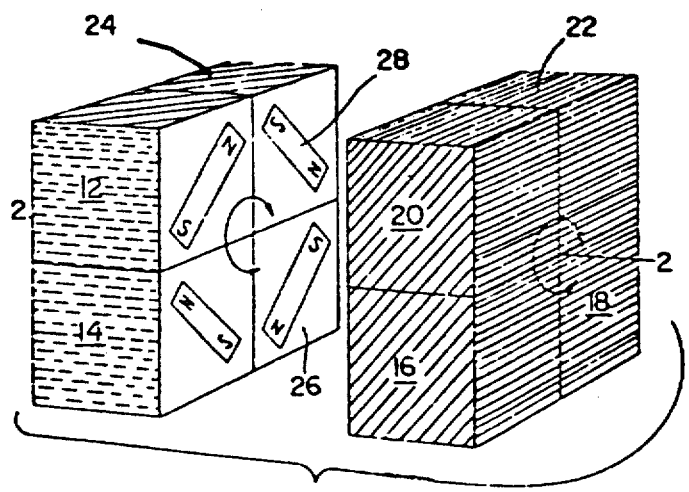

FIG. 2b

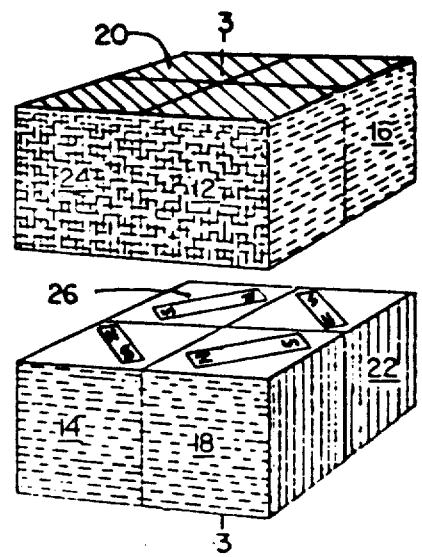

FIG. 2c

UNITED STATES PATENT AND TRADEMARK OFFICE
CERTIFICATE OF CORRECTION

PATENT NO. : 3,655,201
DATED : April 11, 1972
INVENTOR(S) : Larry D. Nicholas

It is certified that error appears in the above-identified patent and that said Letters Patent is hereby corrected as shown below:

Column 2, line 9, "fourth" should read -- third --.

Signed and Sealed this

Twenty-seventh Day of March 1984

[SEAL]

Attest:

GERALD J. MOSSINGHOFF

Attesting Officer    Commissioner of Patents and Trademarks